(12) United States Patent
Guo

(10) Patent No.: US 10,421,339 B2
(45) Date of Patent: Sep. 24, 2019

(54) SOLAR VEHICLE-BORNE AIR-CONDITIONING SYSTEM

(71) Applicant: SHANGHAI YING TA AIRCONDITION ENTERPRISE CO., LTD, Shanghai (CN)

(72) Inventor: Jincai Guo, Shanghai (CN)

(73) Assignee: SHANGHAI YING TA AIRCONDITION ENTERPRISE CO., LTD, Shanghai (CN)

( * ) Notice: Subject to any disclaimer, the term of this patent is extended or adjusted under 35 U.S.C. 154(b) by 0 days.

(21) Appl. No.: 15/511,751

(22) PCT Filed: Dec. 4, 2014

(86) PCT No.: PCT/CN2014/093073
§ 371 (c)(1),
(2) Date: Mar. 16, 2017

(87) PCT Pub. No.: WO2016/082238
PCT Pub. Date: Jun. 2, 2016

(65) Prior Publication Data
US 2017/0291474 A1 Oct. 12, 2017

(30) Foreign Application Priority Data
Nov. 25, 2014 (CN) .......................... 2014 1 0692267

(51) Int. Cl.
*B60H 1/32* (2006.01)
*B60R 16/033* (2006.01)
(Continued)

(52) U.S. Cl.
CPC ....... *B60H 1/3222* (2013.01); *B60H 1/00428* (2013.01); *B60H 1/323* (2013.01);
(Continued)

(58) Field of Classification Search
CPC ..... B60H 1/3222; B60H 1/323; H02J 7/0013; B60R 16/033; B60L 11/1881; F25B 27/005
See application file for complete search history.

(56) References Cited

U.S. PATENT DOCUMENTS

2008/0078193 A1* 4/2008 Lin .................... B60H 1/00428
62/235.1
2008/0078194 A1* 4/2008 Lin .................... B60H 1/00428
62/235.1
(Continued)

FOREIGN PATENT DOCUMENTS

CN 102666161 A * 9/2012 ......... B60H 1/00014

*Primary Examiner* — Emmanuel E Duke

(57) ABSTRACT

A vehicle-borne solar air-conditioning system includes: power supply management controller, battery pack, AC power supply, controller, air-conditioning system; wherein the power supply management controller is used to manage the solar cell set to charge and discharge the battery pack and manage the motor vehicle power supply to charge and discharge the battery pack; the backup power module is used to manage the AC power to charge and discharge the battery pack; the master control module is used to set the working mode, control the solar power supply management module, motor vehicle generation power supply management module and the backup power module to work in a set working mode. The present invention integrates solar energy resources and AC power supply to manage comprehensively three kinds of power supplies through the power supply management controller and allocates them to the motor vehicle air-conditioning system rationally.

3 Claims, 3 Drawing Sheets

(51) Int. Cl.
*F25B 27/00* (2006.01)
*H02J 7/00* (2006.01)
*H02J 7/35* (2006.01)
*B60H 1/00* (2006.01)

(52) U.S. Cl.
CPC .......... *B60R 16/033* (2013.01); *F25B 27/005* (2013.01); *H02J 7/0013* (2013.01); *H02J 7/35* (2013.01); *Y02T 10/88* (2013.01)

(56) References Cited

U.S. PATENT DOCUMENTS

| | | | |
|---|---|---|---|
| 2008/0078195 A1* | 4/2008 | Lin | B60H 1/00428 62/235.1 |
| 2009/0107743 A1* | 4/2009 | Alston | B60H 1/00428 180/65.21 |
| 2010/0090527 A1* | 4/2010 | Tarnowsky | B60H 1/00278 307/10.7 |
| 2010/0175736 A1* | 7/2010 | Reichart | B60L 1/003 136/244 |
| 2010/0213887 A1* | 8/2010 | Louch | H02J 7/35 320/101 |
| 2013/0060396 A1* | 3/2013 | Tomlinson | H02J 3/383 700/295 |
| 2014/0216693 A1* | 8/2014 | Pekarsky | B60H 1/00278 165/104.31 |

\* cited by examiner

Illustration showing the effect of laying solar panels on motor vehicle top

Illustration showing whole vehicle effect

SOLAR VEHICLE-BORNE AIR-CONDITIONING SYSTEM

CROSS REFERENCE OF RELATED APPLICATION

This is a U.S. National Stage under 35 U.S.C 371 of the International Application PCT/CN2014/093073, filed Dec. 4, 2014, which claims priority under 35 U.S.C. 119(a-d) to CN 201410692267.1, filed Nov. 25, 2014.

BACKGROUND OF THE PRESENT INVENTION

Field of Invention

The present invention relates to an air-conditioning control technology and more specifically to a solar vehicle-borne air-conditioning system.

Description of Related Arts

Vehicle-borne air-conditioning system is an integral part of a motor vehicle and simultaneously one of the master energy consumption parts on motor vehicle. Traditional vehicle-borne air-conditioning system relies on consuming vehicle fuel to supply electricity and power to the air-conditioning system. The basic principle is as shown in FIG. 1.

When a motor vehicle engine operates, the power transmission device (belt, gear, etc.) drives the generator and compressor to work. After the generator works, the power energy produced is conveyed to the power-consuming equipment via the motor vehicle battery pack; after the compressor works, the coolant flowing past the internal pipeline is subject to a sufficient compression treatment and circulates through the pipeline. The terminal evaporator fan supplies air to the air pipes of the air-conditioner and the air eventually gets to the air outlets of the motor vehicle.

The mode supplies power to the air-conditioning system by operating the engine in which a large amount of fuel is consumed. Here are its deficiencies:

1. A large amount of environmentally harmful gases will be produced during fuel combustion resulting in aggravated environmental pollution;

2. On the other hand, fuel itself being non-renewable resources can only become less and less.

3. There is a conditional relationship between air-conditioning system and engine, that is, the air-conditioner can be started only after starting the engine. If the engine does not operate, it is unable to start the air-conditioner. If the air-conditioner is to be used normally in temporary parking, the motor vehicle engine cannot stall.

4. It is unable to connect directly an external AC power supply to supply power to the motor vehicle air-conditioner to work.

5. The air-conditioning system cannot start remotely (unless the engine can start remotely).

6. The air outlet size of the air-conditioning system has to be manually adjusted and cannot be adjusted automatically.

SUMMARY OF THE PRESENT INVENTION

In consideration of the above deficiencies existing in the conventional technology, the purpose of the present invention is to provide a vehicle-borne solar air-conditioning system.

A vehicle-borne solar air-conditioning system provided in the present invention includes: a solar cell set, a motor vehicle power supply, an AC power supply, a power supply management controller, a battery pack, a controller and an air-conditioning system; wherein the air-conditioning system comprises a brushless DC motor, a compressor, a condenser, and an evaporator;

wherein, the power supply management controller includes:

a solar power supply management module used to manage the solar cell set to charge and discharge the battery pack;

a motor vehicle generation power supply management module used to manage the motor vehicle power supply to charge and discharge the battery pack;

a backup power module used to manage the AC power supply to charge and discharge the battery pack; and a master control module used to set the system working mode, control the solar power supply management module, motor vehicle generation power supply management module and backup power module to work under the set system working mode;

wherein, the controller includes:

a wireless module used to receive a control command sent by a mobile terminal and send the control command to a control module;

a control module used to control the working of the power-consuming equipment of the air-conditioning system according to the control command;

a brushless motor drive module used to control the brushless DC motor of the air-conditioning system; and a display module used to display an operating condition of the air-conditioning system.

Preferably, there is a working mode A: when the power-consuming equipment of the air-conditioning system works during motor vehicle travelling, the master control module detects the solar cell set and the motor vehicle power supply:

when the solar cell set has a power sufficient for the power-consuming equipment of the air-conditioning system, the motor vehicle power supply is cut off through the motor vehicle generation power supply management module, the power-consuming equipment of the air-conditioning system is driven by the solar power supply management module utilizing solar energy and if there is excessive power, the battery pack is charged through the solar power supply management module;

when the power of the solar cell set is not sufficient, the master control module cuts off the power supply of the solar cell set to the power-consuming equipment of the air-conditioning system, and turns to use the motor vehicle power supply managed by the motor vehicle power supply to supply power to the power-consuming equipment of the air-conditioning system; and still charges the battery pack through the solar cell set until an output voltage of the solar cell set is lower than a lowest charging voltage of the battery pack.

Preferably, there is a working mode B: when the power-consuming equipment of the air-conditioning system works during motor vehicle parking, the motor vehicle power supply is cut off by the master control module through the motor vehicle generation power supply management module:

when the solar cell set has a power sufficient for the power-consuming equipment of the air-conditioning system, the solar cell set is controlled to supply power to the power-consuming equipment of the air-conditioning system through the solar power supply management module; if there is excessive power, the battery pack is charged through the solar power supply management module;

when the power of the solar cell set is not sufficient, the master control module controls the battery pack to provide power energy to the power-consuming equipment of the air-conditioning system by discharging; and controls the solar cell set to charge the battery pack until an output voltage of the solar cell set is lower than a lowest charging voltage of the battery pack;

when electricity quantities of both the solar cell set and the battery pack are not sufficient, the master control module controls the AC power supply to supply power to the air-conditioning system through the backup power module, and charges the batteries under a condition of ensuring working of the air-conditioning system.

Preferably, an air quantity at an air supply port of the air-conditioning system is adjusted automatically according to a temperature, to realize temperature control with the air quantity being variable. More specifically:

when the air-conditioning system operates, the controller obtains a temperature difference according to comparison of temperatures collected in a vehicle with a required temperature set by a user, and controls the air supply quantity of the air-conditioning system according to the temperature difference;

when the temperature in the vehicle is higher than the required temperature set, an air supply port angle becomes larger and an air rate increases; when the temperature in the vehicle reaches the required temperature set, an opening degree of an air outlet is lowered and the air rate is simultaneously reduce.

Preferably, the wireless module receives the remote air-conditioner startup command from the mobile equipment APP in the circumstance that the motor vehicle power supply do not supply power, the control module controlling the air-conditioning system to start working according to the remote air-conditioner starting command, and the AC power supply or battery pack supplies power to the air-conditioning system.

Preferably, when starting the air-conditioning system, the control module of the controller sends a controlled startup command and a rotation speed command to the brushless motor drive module according to the system working mode. After receiving the commands, the brushless motor drive module starts the brushless motor to drive the compressor to operate and adjust the compressor to operate at a required rotation speed according to the rotation speed command received. At the same time, the control module sends a control command to the evaporator and the condenser of the air-conditioning system, both of which operate according to relevant requirements after receiving the control command. The control module performs operation by comparing a temperature in vehicle collected with a set temperature and controls sizes and air rates of different air outlets. Simultaneously, it sends the temperature information and system condition data to the display module. When the control module receives a command from the mobile terminal, it controls according to relevant requirements.

In comparison with the conventional technology, the present invention has the following beneficial effects:

1. The present invention integrates solar energy resources on basis of traditional vehicle-borne air-conditioning system. As a result, emission of harmful gases and energy loss are reduced effectively;

2. The present invention manages comprehensively the solar energy resources, motor vehicle power supply and AC power supply through the power supply management controller and allocates them to the motor vehicle air-conditioning system rationally to ensure the system to work in such a mode as being the most energy-saving and convenient all the time.

3. The present invention adjusts automatically the air quantity at different air outlets by utilizing the temperature difference to ensure the temperature in a vehicle to be constant and uniform to increase the comfort.

4. By utilizing the wireless technology, the present invention can utilize mobile equipment to start and stop remotely the air-conditioning system without having to start the engine. This provides convenience for switching on the air-conditioner ahead of time in summer and winter to pre-cool and preheat the internal space of vehicle to increase the system comfort.

BRIEF DESCRIPTION OF THE DRAWINGS

By reading and referring to the detailed description of the following figures to the non-restrictive embodiments, other characteristics, purposes and advantages of the present invention will become more conspicuous.

DETAILED DESCRIPTION OF THE PREFERRED EMBODIMENT

In the following, an embodiment will be combined to give a detailed description to the present invention. The following embodiment will help the technical people in this field to further understand the present invention. However, it does not restrict the present invention in any form. It should be pointed out that for ordinary technical people in this field, a number of variations and improvements can be made under the prerequisite of not being divorced from the conception of the present invention. All these belong to the protection scope of the present invention.

Solar energy resources is inexhaustible and cannot be used up, which is one of the natural resources having the most capability to solve energy crisis in addition to water resources. Especially in summer, the solar energy resources are rich in particular. On basis of this, the present invention provides a kind of new solar vehicle-borne air-conditioning system, which integrates solar energy resources and AC power supply on basis of traditional vehicle-borne air-conditioning system and as a result, reduces effectively the emission of harmful gases and energy loss. At the same time, the variable air quantity control principle and remote start and stop technology are added to the system to increase the comfort and convenience thereof.

Figure 1:
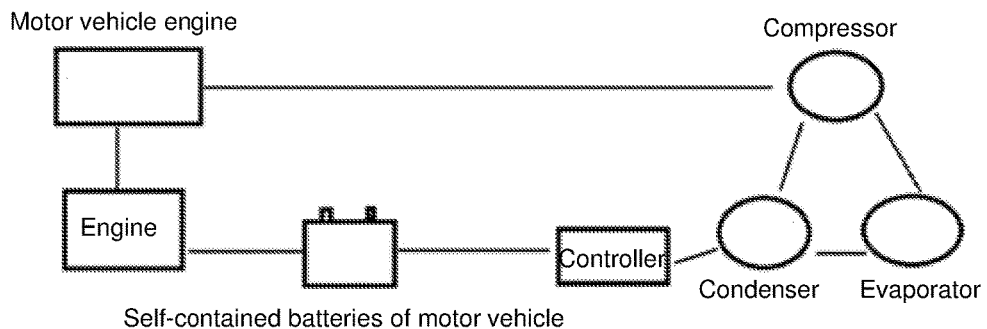
FIG. 1 is a technical scheme of a conventional technology.
Figure 2:
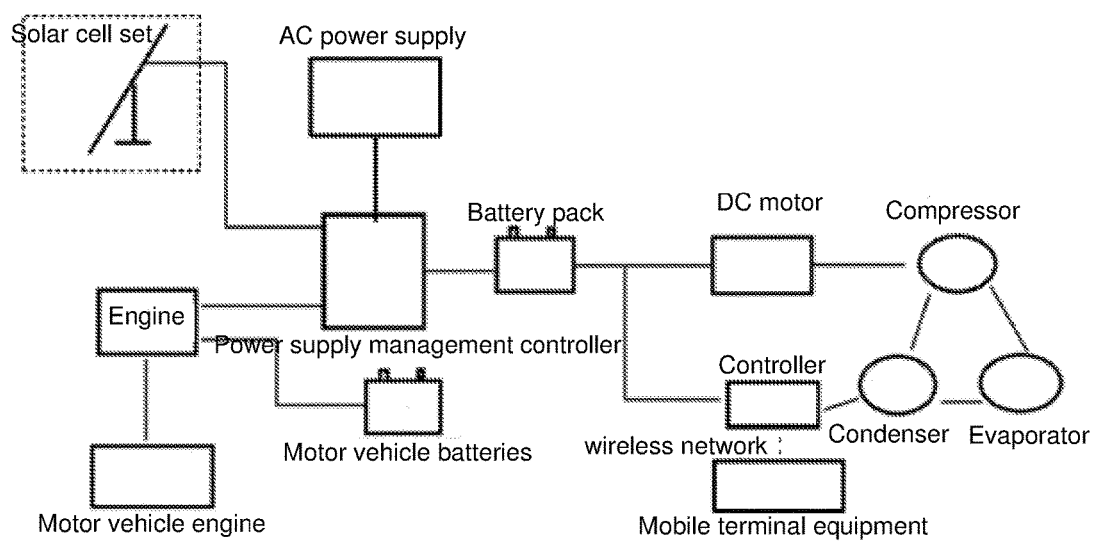
FIG. 2 is a structural schematic diagram of the present invention.

The schematic diagram of the new solar vehicle-borne air-conditioning system is shown in FIG. 2. A compressor of the air-conditioning system is driven by a DC brushless motor. A power supply manager manages in a unified manner multi-way supply of power of the system. When the power supply manager detects that an electricity quantity at a solar end is sufficient, the power supply manager cuts off the supply of power to the motor vehicle generator end automatically; when detecting that the solar power is not sufficient, the power supply manager switches to the motor vehicle system for supplying power. In a parking condition, the power supply manager is also able to connect directly to an AC power supply for supplying power and charging.

Figure 3:
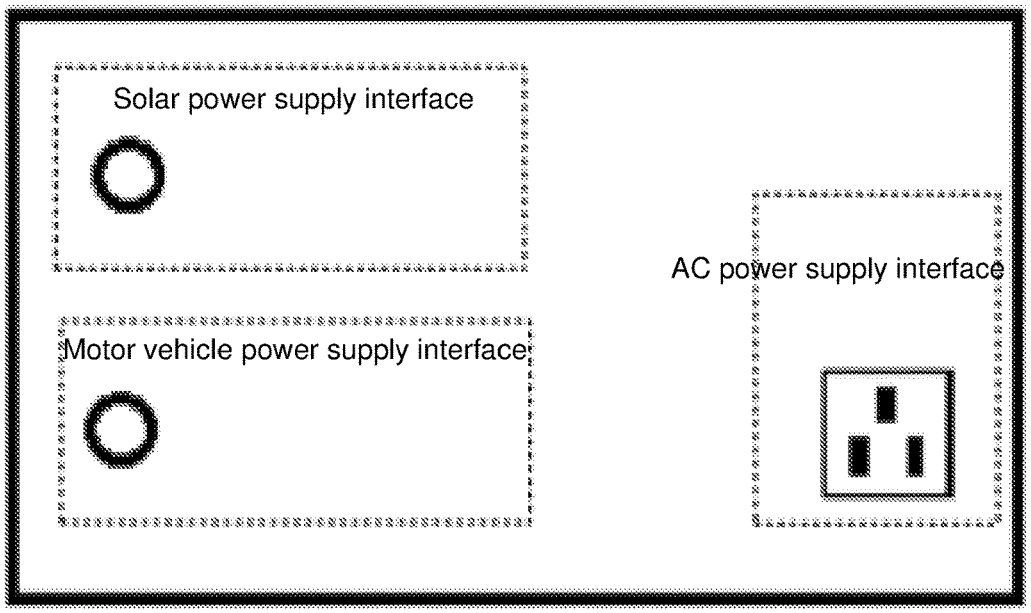
FIG. 3 shows a power supply control manager interface.
Figure 4:
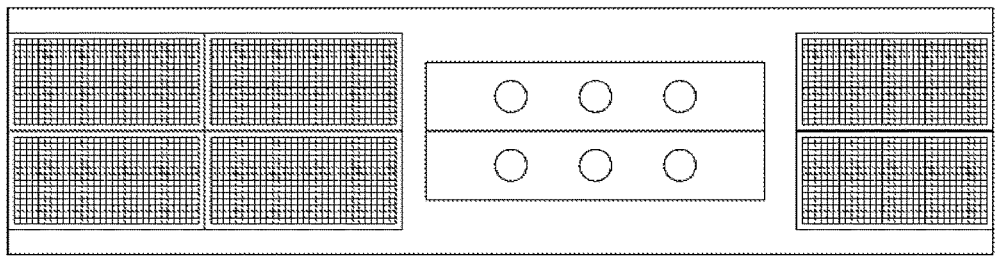
FIG. 4 shows an appearance of a vehicle-borne solar air-conditioning system and a corresponding relation between a top view and a side view of the whole vehicle.
Figure 4:
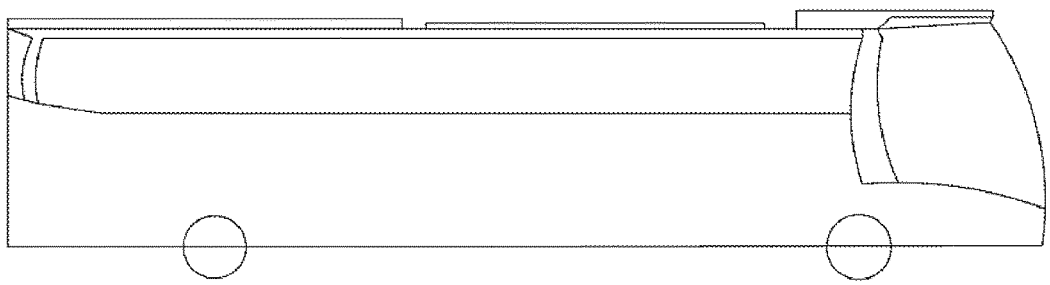
Figure 5:
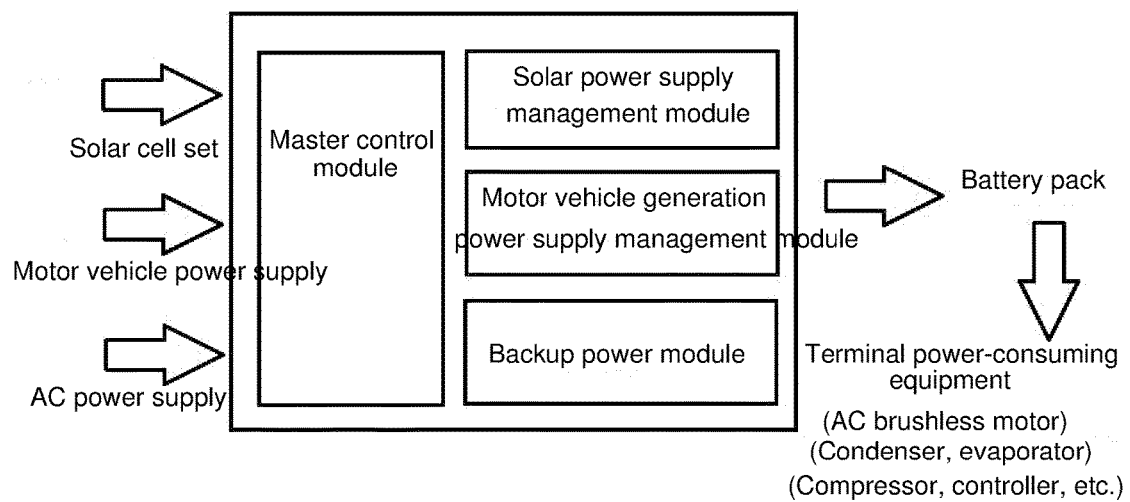
FIG. 5 is a structural schematic diagram of a power supply management controller.

Specifically, a solar cell set is laid on a vehicle top (as shown in FIG. 3), which is connected to a power supply management controller after being paralleled. The power supply management controller is responsible for solar energy battery charging management (preventing battery float charging, overcharging, etc.). At the same time, electricity from a motor vehicle generation system is also connected to the power supply management controller and conveyed to the DC motor (responsible to drive the compressor) and an evaporator, a condenser and a controller of the air-conditioning system after being subject to the unified management by the power supply manager;

wherein, the battery pack, the power supply management controller, the DC motor, the compressor, the evaporator and the condenser are all integrated in an external unit of the vehicle-borne air-conditioning system, as shown in FIG. 4. The controller is located inside the motor vehicle (which can be fixed or hanged at any position of the central controller) to display an actual temperature in the vehicle and working conditions of all system parts. A user may set up parameters and perform manual operation through the controller. At the same time, a wireless network (3G, 4G, or wifi) is embedded in the controller. A customer is able to start and stop the air-conditioning system remotely through the mobile equipment. A temperature sensor is located at an air return port of the air-conditioning system, which is responsible to collect the real-time temperature in the vehicle.

Figure 6:
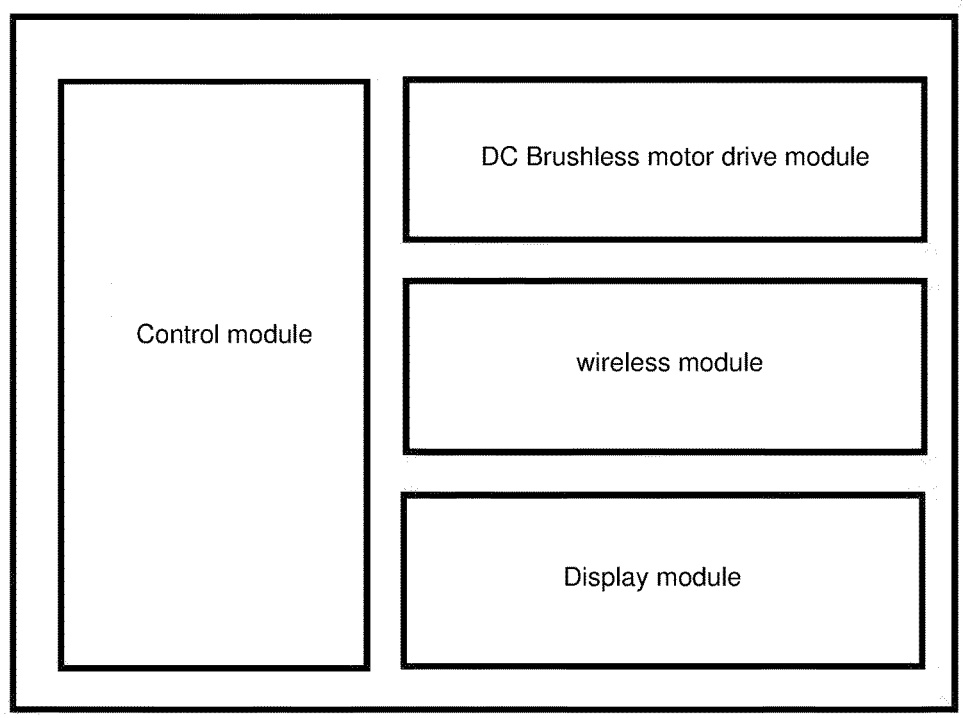
FIG. 6 is a structural schematic diagram of a controller.

Further, the power supply management controller is responsible for the power supply management of the whole system, and a core thereof comprises a solar power supply management module, a motor vehicle power supply management module and an AC power supply management module. The block diagram is shown in FIG. 6, wherein the power-consuming equipment of the air-conditioning system includes the DC brushless motor, the condenser, the evaporator, and the compressor.

The solar power supply management module is responsible for management of solar battery charging and discharging and has such protections as against overcharging, over-discharging, overload, over-temperature, over-current, etc. The motor vehicle generation power supply management module is responsible to manage the motor vehicle power supply to prevent battery charging and discharging. Similarly, it also has such protections as against overcharging, over-discharging, overload, over-temperature, over-current, etc. The backup power module is responsible to manage the AC power supply and prevent battery charging and discharging. Similarly, it also has such protections as against overcharging, over-discharging, overload, over-temperature, over-current, etc.

When the air-conditioning system works during a motor vehicle travelling, the master control module detects two ways of power supplies (solar cell set and motor vehicle power supply). When a power of the solar cell set is sufficient for the terminal power-consuming equipment, motor vehicle power supply is cut off and the vehicle-borne air-conditioning system is driven by the solar power supply management module utilizing solar energy. If there is excessive power, the battery pack is charged through the solar power supply management module; when the solar energy power is not sufficient, the master control module cuts off the solar cell set supplying power to the system and turns to use the motor vehicle power supply managed by the motor vehicle generation power supply to supply power to the system. At this point, the solar cell set still charges the batteries until the solar energy is lower than a lowest charging voltage.

During motor vehicle parking (the motor vehicle stalls and the engine does not work), the master control module switches directly to the system power supply for supplying power to the solar cell set. When the power of the solar cell set is sufficient for the terminal power-consuming equipment, the vehicle-borne air-conditioning system is driven by the solar power supply management module utilizing solar energy. If there is excessive power, the battery pack is charged through the solar power supply management module; when the solar energy power is not sufficient, the system is discharged directly by the battery pack for working. At this point, the solar cell set still charges the batteries until the solar energy is lower than the lowest charging voltage. If the electricity quantity of the batteries is not sufficient, connection can be made directly to the AC power supply to supply power to the air-conditioning system after being managed by the backup power module.

The power supply management controller manages comprehensively the solar cell power supply, motor vehicle power supply and AC power supply; and allocates them rationally to the air-conditioning system to ensure the system to work in such a mode as being the most energy-saving and convenient all the time.

If it is hoped to start the air-conditioner ahead of time when the motor vehicle is parked, a mobile equipment APP software may be utilized to send a command to the motor vehicle controller through a wireless network. After receiving the control command, the motor vehicle controller starts the air-conditioner to achieve pre-cooling and preheating operation in the motor vehicle.

During air-conditioner operation, the system compares the temperature information collected in the vehicle with a set value. When a temperature difference is large, an opening degree of the air outlet and an air rate are increased, so that the temperature in the vehicle will reduce to a required level within a shortest possible time. When the temperature difference is small, the opening degree of the air outlet and the air rate are reduced to ensure the temperature in the vehicle to be constant and comfortable.

An embodiment of the present invention is described above. It is necessary to understand that the present invention is not restricted to the above specific embodiment. The technical people in this field can make different variations or modifications within the range of claim and this does not influence the essential contents of the present invention.

What is claimed is:

1. A vehicle-borne solar air-conditioning system, including: a solar cell set, a motor vehicle power supply, an AC power supply, a power supply management controller, a battery pack, a controller and an air-conditioning system;
   wherein, the power supply management controller includes:
   a solar power supply management module used to manage the solar cell set to charge and discharge the battery pack;
   a motor vehicle generation power supply management module used to manage the motor vehicle power supply to charge and discharge the battery pack;
   a backup power module used to manage the AC power supply to charge and discharge the battery pack; and
   a master control module used to choose a system working mode A or B, and control the solar power supply management module, the motor vehicle generation power supply management module and the backup power module to work under the system working mode set;

wherein, the controller includes:

a wireless module used to receive a control signal sent by a mobile terminal and send the control signal to a control module;

the control module used to control working of a power-consuming device of the air-conditioning system according to the control signal;

a brushless motor drive module used to control the brushless DC motor of the air-conditioning system; and a display module used to display an operating environment of the air-conditioning system;

wherein in a working mode A: when the power-consuming device of the air-conditioning system works during motor vehicle travelling, the master control module detects the solar cell set and the motor vehicle power supply;

when the solar cell set has a power sufficient for the power-consuming device of the air-conditioning system, the motor vehicle power supply is cut off through the motor vehicle generation power supply management module, the power-consuming device of the air-conditioning system is driven by the solar power supply management module utilizing solar energy, and if there is excessive power, the battery pack is charged through the solar power supply management module;

when the power of the solar cell set is not sufficient, the master control module cuts off the power supply of the solar cell set to the power-consuming device of the air-conditioning system, and turns to use the motor vehicle power supply managed by the motor vehicle power supply to supply power to the power-consuming device of the air-conditioning system; and still charges the battery pack through the solar cell set until an output voltage of the solar cell set is lower than a lowest charging voltage of the battery pack;

wherein in a working mode B: when the power-consuming device of the air-conditioning system works during motor vehicle parking, the motor vehicle power supply is cut off by the master control module through the motor vehicle generation power supply management module;

when the solar cell set has a power sufficient for the power-consuming device of the air-conditioning system, the solar cell set is controlled to supply power to the power-consuming device of the air-conditioning system through the solar power supply management module; if there is excessive power, the battery pack is charged through the solar power supply management module;

when the power of the solar cell set is not sufficient, the master control module controls the battery pack to provide power energy to the power-consuming device of the air-conditioning system by discharging; and controls the solar cell set to charge the battery pack until an output voltage of the solar cell set is lower than a lowest charging voltage of the battery pack;

when electricity quantities of both the solar cell set and the battery pack are not sufficient, the master control module controls the AC power supply to supply power to the air-conditioning system through the backup power module, and charges the batteries under a condition of ensuring working of the air-conditioning system.

2. The vehicle-borne solar air-conditioning system according to claim 1, wherein an air flow rate of the air-conditioning system is adjusted automatically to realize temperature control with the air flow rate being variable; specifically:

when the air-conditioning system operates, the controller obtains a temperature difference between temperatures collected in a vehicle with a required temperature set by a user, and controls the air supply quantity of the air-conditioning system according to the temperature difference;

when the temperature in the vehicle is higher than the required temperature set, an air rate increases; when the temperature in the vehicle reaches the required temperature set, the air rate is simultaneously reduce.

3. The vehicle-borne solar air-conditioning system according to claim 1, wherein the wireless module receives a remote air-conditioner startup signal from a mobile equipment interface in a circumstance that the motor vehicle power supply do not supply power, the control module controls the air-conditioning system to start working according to the remote air-conditioner starting command, and the AC power supply or the battery pack supplies power to the air-conditioning system.

* * * * *